(12) United States Patent
Theis

(10) Patent No.: US 6,201,864 B1
(45) Date of Patent: Mar. 13, 2001

(54) AUTOMATIC AREA CODE DETECTOR AND DIALER

(75) Inventor: Peter F. Theis, McHenry, IL (US)

(73) Assignee: Illinois Technology Transfer LLC, Gurnee, IL (US)

( * ) Notice: Subject to any disclaimer, the term of this patent is extended or adjusted under 35 U.S.C. 154(b) by 0 days.

(21) Appl. No.: 09/290,010

(22) Filed: Apr. 10, 1999

Related U.S. Application Data

(63) Continuation of application No. 08/440,008, filed on May 12, 1995, now Pat. No. 5,917,904.

(51) Int. Cl.[7] .................................................. H04M 1/27
(52) U.S. Cl. ...................... 379/355; 379/355; 379/354; 379/356; 379/216
(58) Field of Search .................................. 379/355, 356, 379/354, 216, 359, 112, 196, 207

(56) References Cited

U.S. PATENT DOCUMENTS

| | | | |
|---|---|---|---|
| 4,341,929 | * | 7/1982 | Alexander et al. ................... 379/354 |
| 4,633,041 | * | 12/1986 | Boivie et al. ......................... 379/354 |
| 4,723,265 | * | 2/1988 | Kamei et al. ......................... 379/354 |
| 4,736,410 | * | 4/1988 | Nisjida et al. ........................ 379/354 |
| 4,800,582 | * | 1/1989 | D'Agosto, III et al. ............. 379/216 |
| 4,839,919 | * | 6/1989 | Borges et al. ..................... 379/93.21 |
| 4,908,853 | * | 3/1990 | Matsumoto .......................... 379/355 |
| 4,928,302 | * | 5/1990 | Kaneuchi et al. ................... 379/357 |
| 4,945,557 | * | 7/1990 | Kaneuchi et al. ................... 379/354 |
| 4,964,159 | * | 10/1990 | Son ...................................... 379/355 |
| 5,134,653 | * | 7/1992 | Satomi et al. ....................... 379/355 |
| 5,136,637 | * | 8/1992 | Rust et al. ........................... 379/356 |
| 5,157,719 | * | 10/1992 | Waldman ............................. 379/355 |
| 5,303,288 | * | 4/1994 | Duffy et al. ......................... 379/354 |
| 5,455,858 | * | 10/1995 | Lin ....................................... 379/355 |
| 5,457,738 | * | 10/1995 | Sylvan ................................. 379/354 |
| 5,459,774 | * | 10/1995 | Breeden et al. ..................... 379/354 |
| 5,475,743 | * | 12/1995 | Nixon et al. ......................... 379/355 |
| 5,568,546 | * | 10/1996 | Marutiak ............................. 379/355 |
| 5,917,904 | * | 6/1999 | Theis .................................... 379/355 |

* cited by examiner

*Primary Examiner*—Forester W. Isen
*Assistant Examiner*—Jaques Saint-Surin
(74) *Attorney, Agent, or Firm*—Samuel A. Kassatly

(57) ABSTRACT

The present invention allows for the automatic dialing of local and long distance calls in the United States, as well as automatic dialing of international calls. The automatic dialing feature is accomplished, in part, by implementing a computerized data base grouped in N—files. These files may be searched by the computer system during and after the caller dials a number. If the dialed number matches one of the numbers in the files, the system may automatically out-dial the dialed number.

36 Claims, 6 Drawing Sheets

AUTOMATIC AREA CODE DETECTOR AND DIALER

CROSS-REFERENCE TO RELATED APPLICATIONS

This is a continuation of U.S. patent application Ser. No. 08/440,008, filed on May 12, 1995, now U.S. Pat. No. 5,917,904, and titled "Automatic Area Code Detector And Dialer", which is incorporated herein by this reference in its entirety.

BACKGROUND OF THE INVENTION

The present invention relates generally to a system for automatically dialing a dialed number and a switching code, which is used for routing calls and may include 1+, area codes, international access codes, including foreign country and foreign city codes, and other information that is determinative of the routing of a telephone call. More particularly, the present invention relates to a system for automatically selecting and dialing the proper switching code for a dialed number. Still more particularly, when a number is dialed, the system of the present invention utilizes an internal table or data base to determine the proper switching code for the dialed number.

With current technology, there are several ways to automatically select the proper switching code for a dialed number. One relatively simple way is to use phones that utilize a memory dialer. Under this system, a long distance or local number can be automatically selected from a pre-entered directory by dialing an abbreviated name, telephone number or code. Other systems have data bases that are constructed based on manually preentered names and addresses.

U.S. Pat. Nos. 4,341,929, 4,633,041, 4,723,265, 4,736,410, 4,800,582, 4,839,919, 4,908,853, 5,134,653, and 5,157,719 provide an overview of patented devices relating to the subject matter of the present invention. U.S. Pat. No. 5,157,719 teaches a system that stores the last area code dialed and displays that area code after the system detects the start of the next call. The caller may then select the last area code dialed, not use it so that the call becomes local, or enter a new area code. U.S. Pat. No. 5,134,653 teaches an automatic speed dialing device for facsimile machines. The device utilizes coded numbers to represent larger string telephone numbers that are stored in the system. U.S. Pat. No. 4,908,853 teaches a speed dialing apparatus that displays selected names and numbers stored in a memory. The operator can use a selector key to instruct the apparatus to dial the desired number appearing on the display. U.S. Pat. No. 4,736,410 teaches a system that cross links a stored telephone number with a coded number.

SUMMARY OF THE INVENTION

The present invention comprises four principle elements: (1) a telephone instrument; (2) a computer; (3) an automatic dialer; and (4) a telephone line. The present invention may be used for a particular telephone subscriber or a particular telephone number. The means to effect the present invention can be located near or in a caller's telephone instrument, a PBX, or a telephone company central office. Additionally, the present invention can be used with both wireless and wire telephones. The preferred embodiment of the present invention is a system for automatically dialing local and long distance calls in the United States. However, the same system could also be used for dialing international calls as well.

The computer contains the system of the present invention which includes a data base grouped into N—files. These files may be searched by the computer system during and after the caller dials a number. The system first determines during dialing whether the dialed number exactly corresponds to any of the restricted numbers in File 2, which stores numbers that have been selected for special handling. If the dialed number matches one of the restricted numbers, the system will either automatically out-dial the dialed number or the system will abort the call, depending on whether the dialed number is subject to automatic dialing.

If the dialed number does not match one of the restricted numbers, the system determines whether the first digit dialed was a 1. If the first digit dialed was a 1, the system will then determine whether ten additional digits have been dialed. In the event that ten additional digits were not dialed, the system will abort the call. On the other hand, if ten additional digits were dialed, the system out-dials the eleven digit number and stores the out-dialed number in the front of File 1, which stores one of each of the numbers that previously has been dialed. In this manner, File 1 is continuously and automatically updated as numbers are out-dialed.

If the system determines that the first digit dialed is not a 1, the system will then determine whether seven digits have been dialed. In the event that seven digits were not dialed, the system will abort the call. On the other hand, if seven digits were dialed, the system determines whether the right hand most seven digits of any number in File 1 match the dialed number. If there is a match and the caller approves the number to be dialed, the system out-dials the number and moves the out-dialed number to the front of File 1.

If there is a match and the caller rejects the number but elects to continue the search or if there is no match, the system will then determine whether the prefix of the seven digit dialed number is located in File 3, which stores all of the prefixes in the caller's local area code. If the prefix of the dialed number appears in File 3 and the caller approves the number to be dialed, the system out-dials the number and moves the out-dialed number to the front of File 1. If there is a match and the caller rejects the number but elects to continue the search or if there is no match, the system will then determine whether the prefix of the dialed number is located in the highest priority outside area code file, which stores the prefixes of the highest priority outside area code. The system proceeds through each of the N—priority outside area code files, in the same manner described above, until a match is approved and the 1+area code with the number dialed is out-dialed and stored in File 1 or until the last file has been searched without a match. The process may be interrupted, of course, if the caller hangs up or the telephone line is no longer available.

In accordance with the above description, the data base of the system of the present invention need only contain area codes and telephone numbers, and the system need not cross link any of these numbers with a caller selected name, abbreviated name or code number. Additionally, the system continually updates and alters the data base by storing previously dialed numbers in File 1. The concept of linking a particular telephone number to its area code based on (1) the combination of the number and area code having been previously dialed, and (2) based on the available exchange prefix in selected area codes is novel.

These and other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the invention, reference will now be made to the accompanying drawings, wherein.

DETAILED DESCRIPTION OF THE PREFERRED EMBODIMENT

Figure 1:
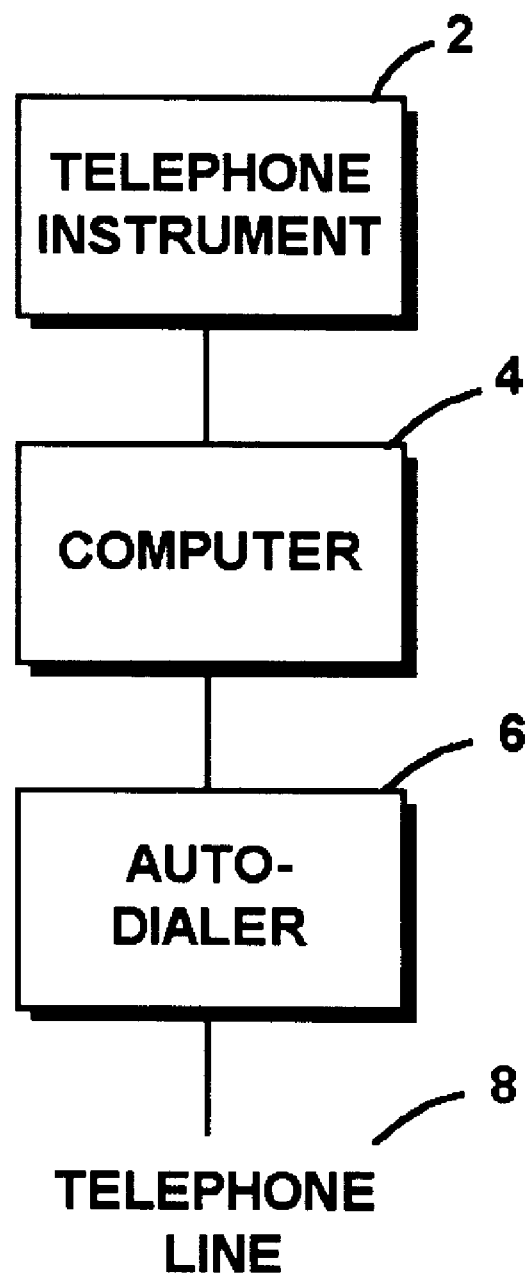
FIG. 1 shows an automatic area code detector and dialer system constructed in accordance with the preferred embodiment.

Referring now to FIG. 11 a block diagram depicting the present invention is shown. The present invention comprises four principal elements: (1) a telephone instrument 2; (2) a computer 4; (3) an automatic dialer 6; and (4) a telephone line 8. The telephone instrument 2 may be a conventional telephone or an instrument with a display. The computer 4 implements the system and methodology of the present invention, and the automatic dialer 6 preferably comprises an interface card, which can out-dial numbers. Such interface cards are commonly available and are made by Natural Microsystems, Inc. (Model VBX 100 or VBX 400) and Dialogic Corporation.

In the preferred embodiment, the telephone type instrument 2 is connected to the computer 4. Alternatively, the telephone instrument 2 and the computer 4 can be integrally self contained. Accordingly, the computer 4 can be located near or in the caller's telephone instrument. Alternatively, the system of the present invention could be part of a PBX system or located at the telephone company central office. Additionally, one skilled in the art will recognize that the present invention could be used with cellular phones, internet addresses, and television channel lookups, and will also recognize that the principles of this invention are applicable to any application involving repetitive lookups from a large data base.

The computer 4 is preferably connected to either an external or internal telephone line interface card 6, which is connected to a telephone line 8. The interface card can be connected to a wide range of telephone lines. In accordance with this design, the telephone instrument 2 controls the computer 4, and the computer 4, through the interface card 6, controls the telephone line 8.

The computer 4 of the present invention includes a data base grouped into N—Files. File 1 preferably contains each of the numbers that have most recently been dialed. The numbers are complete with a one and the switching code where applicable. If a number was dialed several weeks ago, and the same number is dialed again, the system of the present invention will move the dialed number to the chronological front of File 1 and the dialed number will only be entered once in the data base. In this way, the most commonly used numbers are always stored by the system near the chronological front of File 1 and the most recently dialed number will be placed at the front of the file.

Because computer memory has finite limits, it may be necessary to limit the number of telephone numbers stored in File 1. Thus, if the list of numbers becomes too extensive, the system will delete the numbers at the back of the file, which indicates that these numbers have not been used recently. Such memory management minimizes the memory required, the search time, and the processing time by (a) deleting the oldest dialed numbers, and (b) maintaining the file so that each phone number only appears once. Memory management is further minimized in the present invention by not adding indexing files, or sequencing or chronology information with the stored telephone number. There are other techniques for accomplishing this objective, and the particular technique described is only a model.

For illustrative purposes only, an example of numbers that might be found in File 1 is shown below.

1-312-876-3849
1-815-261-4736
1-217-431-2843
882-3164
1-415-371-5993
781-3811
882-2490
1-708-249-9773
and other numbers dialed In this specific example, the number 1-312-876-3849 was the last out-dialed number and thus, is placed at the "chronological front" of File 1 (or in the initial address location of File 1). The number 1-815-261-4736 was out-dialed immediately prior to 1-312-876-3849 and the number 1-217-431-2843 was out-dialed immediately prior to 1-815-261-4736. As illustrated by the example, the most recently out-dialed number is stored at the chronological front of File 1. In this manner, the out-dialed numbers are stored in a specific sequence in File 1, which is continually and automatically updated as numbers are out-dialed.

To solve the problem of having a wrong number entered into the data base, the system of the present invention can monitor the length of a call, or whether the call was completed. If the call was less than 15 seconds, for example, the number will not be stored in the data base. If the system has access to call completion information, such as if it is installed as part of a Central Office system, then the system will enter the number in the data base only of the call was completed. Other methods are available and known to those skilled in the art to detect call completion.

One skilled in the art will also recognize that in lieu of storing the out-dialed numbers in a particular sequence in File 1, a chronological indexing scheme could be used. In such a scheme, the out-dialed numbers may be stored in a particular location with a corresponding index or key number. Another scheme would be to maintain a file with each number called associated with a time and date of the call. This file may or may not be maintained in random order. When a call is placed to a number already in the file, the time and date would be updated. Thus, to limit the size of the file, those numbers called with the oldest time and date would be deleted in order to clear memory. The method of maintaining this file is well known by those skilled in the art.

File 2 preferably includes numbers that have been selected for special handling. For example, if the number 555-1212 were dialed, it would be rejected due to the lack of a switching code. Similarly, numbers such as 911, 411, and 611 would be dialed without going through the computer switching code matching. Any number starting with "0" might also be automatically dialed without referencing any files followed by connecting the caller directly to the line to finish dialing. However, "0" could be handled similar to a 1+number. For illustrative purposes only, an example of numbers that might be found in File 2 is shown below:

555-1212 (Information)
911
411
611
0+

In the preferred embodiment, File 3 comprises a plurality of fields and contains all the prefixes in the user's local area code, which is the switching code for File 3. The prefixes are published information and each field in File 3 contains a prefix. An example of File 3 is shown below:

201
   202
   203
   204
   206
   207
   214
   220
   221
   222
   223 and other prefixes in the local calling area code.

File 4, which comprises a plurality of fields, preferably includes all the prefixes in a first priority outside area code, which is the switching code for File 4. The initial field in File 4 is 1 plus the area code. Each of the following fields contains a prefix from the first priority outside area code. An example of File 4 is shown below:

Area Code: 1-815
   329
   332
   334
   335
   337
   338
   339
   341 and other prefixes in first priority outside area code

File 5 preferably includes all the prefixes in a second priority outside area code, which is the switching code for File 5. The initial field in File 5 is 1 plus the second priority outside area code. Each of the following fields contains a prefix from the second priority outside area code. An example of File 5 is shown below:

Area Code: 1-219
   261
   262
   263
   264
   265
   266
   267
   268 and other prefixes in the second priority outside area code.

Similarly, each additional file contains all the prefixes in the corresponding outside area codes, which are the switching codes for these files. For example, File N, which is the last file, contains all the prefixes in the last priority outside area code. The initial field in File N is 1 plus the last priority outside area code. Each of the following fields in File N contains a prefix from that last priority outside area code. Organizing the data base in this fashion allows each of the desired area codes and their corresponding prefixes to be contained in separate files. It should be noted that, except for File 1 which stores numbers in a specific sequence, the files do not have to include the numbers in any particular order.

Additionally, one skilled in the art will recognize that files containing other switching codes (e.g. international access codes, foreign country codes and foreign city codes) and their corresponding local numbers or prefixes can be added to the data base in order to expand the capability of the preferred embodiment. One skilled in the art will recognize, therefore, that although the preferred embodiment is based on the 1+area code system in the United States, the system could easily be expanded to route calls to foreign countries by adding files containing other switching codes.

In operation, when the caller takes the phone 2 off hook, the computer 4, through the interface card, takes the telephone line 8 off hook to prevent an incoming call from seizing the line 8. Numbers are not out-dialed as the caller dials them, but rather as the computer 4 performs its routine of searching the files and out-dials them through an interface card.

Figure 2A:
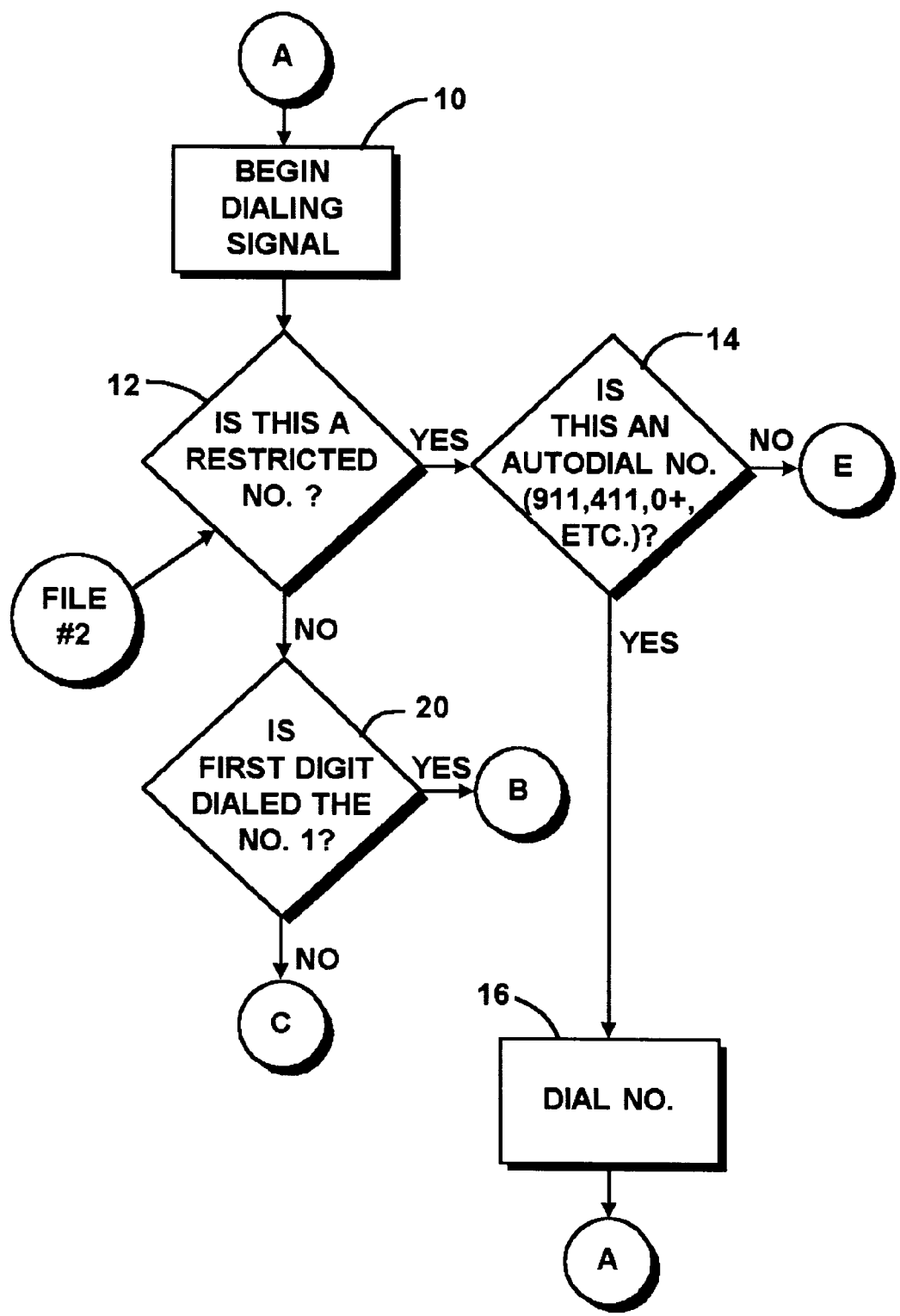
FIGS. 2A–2G comprise a flowchart illustrating the operation of the system of FIG. 1.

Referring now to FIG. 2A, the operation of the system of the present invention begins at Point A. The dialing process starts when the caller dials a number in step 10. This process typically includes indicating that an outbound call is to be made, and then dialing the desired number. A common way to indicate the beginning of an outbound call is for the phone 2 to go off hook, and the central telephone office to respond with a dial tone. Alternatively, other telephone instruments could indicate that the phone is ready to out-dial by using a visual display or a different mode of auditory signal.

As the caller dials a number in step 10, the system first determines in step 12 whether the sequence of dialed numbers exactly corresponds to any of the restricted numbers in File 2. As previously explained, File 2 contains numbers for telephone services that are area code independent (e.g., 911, 611 and 411), and numbers for which the area code, but not the seven digit number, change with each call (e.g., 1-XXX-555-1212). If the dialed number matches one of the restricted numbers, the system will then determine in step 14 whether the dialed number is subject to automatic dialing. If the dialed number is subject to automatic dialing, the number will automatically be out-dialed in step 16 without further involving the system. As shown in step 14, area code independent numbers, such as 911, 411, and 0+, are all automatically out-dialed in step 16. If, on the other hand, the dialed number is not one that can be out-dialed, the call will be aborted by the system at Point E, shown in FIG. 2E.

Figure 2B:
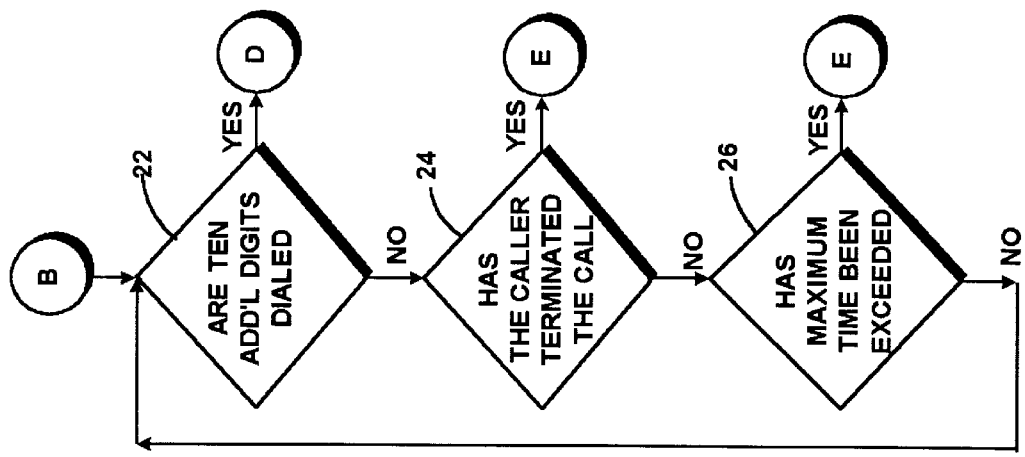
Figure 2C:
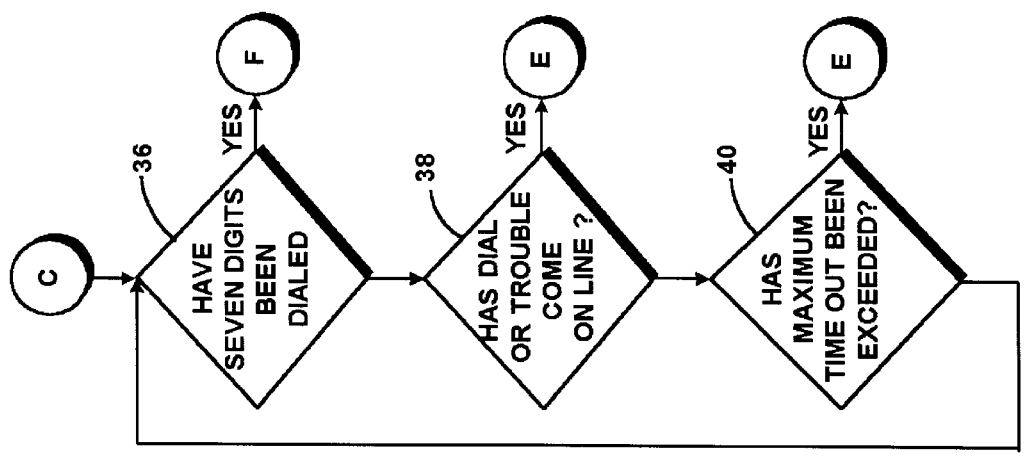
Figure 2D:
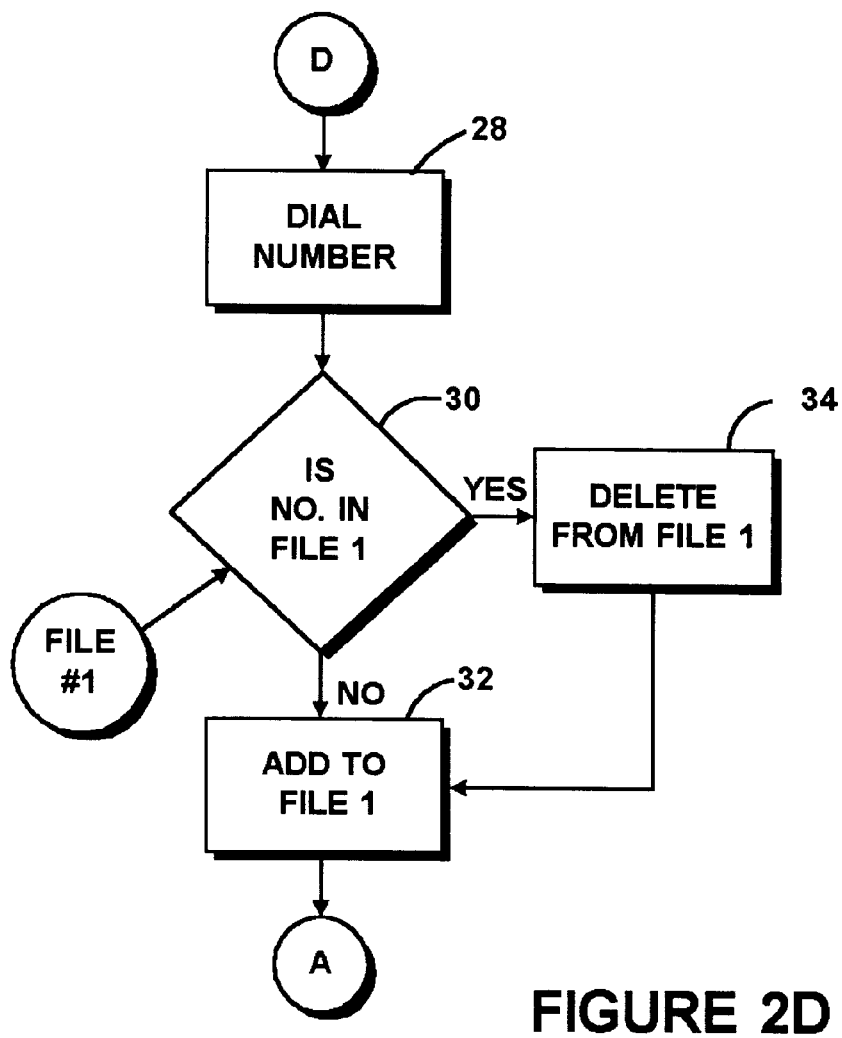
Figure 2E:
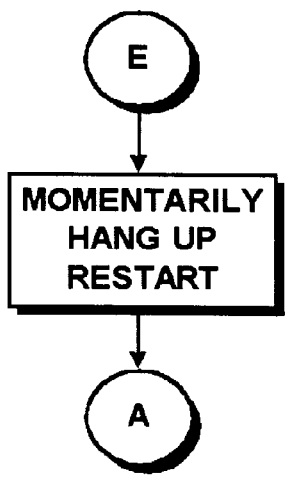

Referring to FIG. 2E, one way to abort a call is for the caller to momentarily hang up the telephone 4. Another way to abort the call is for the system to hang up or remove the dial tone. The computer can then either display an error message on the telephone, give an audio message or provide a distinctive tone so that the caller knows the call must be started again. Alternatively, the computer may connect the caller to the telephone line directly so that the caller can hear the trouble recording. Such systems are currently available with telephone systems that block calls to specified numbers. Once the call has successfully been aborted, the system returns to Point A and the dialing process begins anew.

Referring again to FIG. 2A, if the dialed number does not match one of the restricted numbers in File 2, the system determines in step 20 whether the first digit dialed was a 1, which indicates a long distance call. In those areas where 1+ dialing is not utilized to indicate a long distance call, the determination in step 20 would be based on whether the second digit dialed is either a 0 or 1. The technology, in any event, should be similar to that used in PBX systems, or the central office to differentiate a local prefix from an area code. Another alternative is to wait for several seconds after dialing, and once that period of non-dialing has occurred, process the call as if all numbers had been dialed. If there are ten numbers, the call is treated the same as a 1+ call. Otherwise, the call is treated as a non 1+ call.

If the system determines in step 20 that the first number dialed is a 1, then the system goes to Point B, shown in FIG. 2B. Referring to FIG. 2B, the system then determines in step 22 whether ten additional digits have been dialed, i.e., the caller has dialed 1+area code+seven digits. If ten additional digits have not been dialed, the system will determine in step 24 whether the caller has terminated the call (the caller has hung up) or the telephone line is no longer available (the dial tone has disappeared, or a trouble recording, "We're sorry . . .", has been triggered). If either of these events has occurred, the call will be aborted by the system at Point E and the system will return to starting Point A. On the other hand, if neither of these events has occurred, the system will determine in step 26 whether the maximum delay time for dialing has been reached. A common delay time might be 20 seconds. An alternative delay period would be 20 seconds after the last digit dialed. If the delay period expires without the caller dialing ten additional digits, the call is aborted by the system at Point E and the system returns to starting Point A. At this point, the caller must start the dialing process anew as shown in FIG. 2E.

If none of these aborting events occurs and the system recognizes in step 22 that 1 plus ten digits have been dialed, the system goes to Point D, shown in FIG. 2D. Referring to FIG. 2D, the system then out-dials the eleven digit number in step 28. Alteratively, if the caller has inadvertently dialed one plus his own local area code (plus a seven digit local number), the system has the capability to recognize that the dialed area code is unnecessary, at which point the system will automatically omit the one plus area code when out-dialing the seven digit number. After out-dialing the number, the system determines in step 30 whether the out-dialed number is in File 1, i.e., whether the out-dialed number matches one of the numbers in File 1. If the out-dialed number is not found in File 1, the system in step 32 adds the out-dialed number with 1+the area code at the chronological front of File 1. The system then goes to Point A, at which time the system is ready when the next number is dialed. If the out-dialed number is found in File 1, ie., there is a match, the system in step 34 deletes the number from File 1 and then, in step 32, relocates the out-dialed number at the front of File 1. As described above, the system then goes to Point A, at which time the system is ready when the next number is dialed.

Referring again to FIG. 2A, if the system determines in step 20 that the first digit dialed is not a 1, i.e., the first digit is not indicative of a long distance call, then the system goes to Point C, shown in FIG. 2C. Referring to FIG. 2C, the system then determines in step 36 whether seven digits have been dialed. If seven digits have not been dialed, the system will determine in step 38 whether the caller has terminated the call or the telephone line is no longer available. If either of these events has occurred, the call will be aborted by the system at Point E and the system will return to starting Point A. If neither of these events has occurred, the system will then determine in step 40 whether the maximum delay time for dialing has been reached. If the delay period expires without the caller dialing seven digits, the call is aborted by the system at Point E. At this point the caller must start the process anew as shown in FIG. 2E.

Figure 2F:
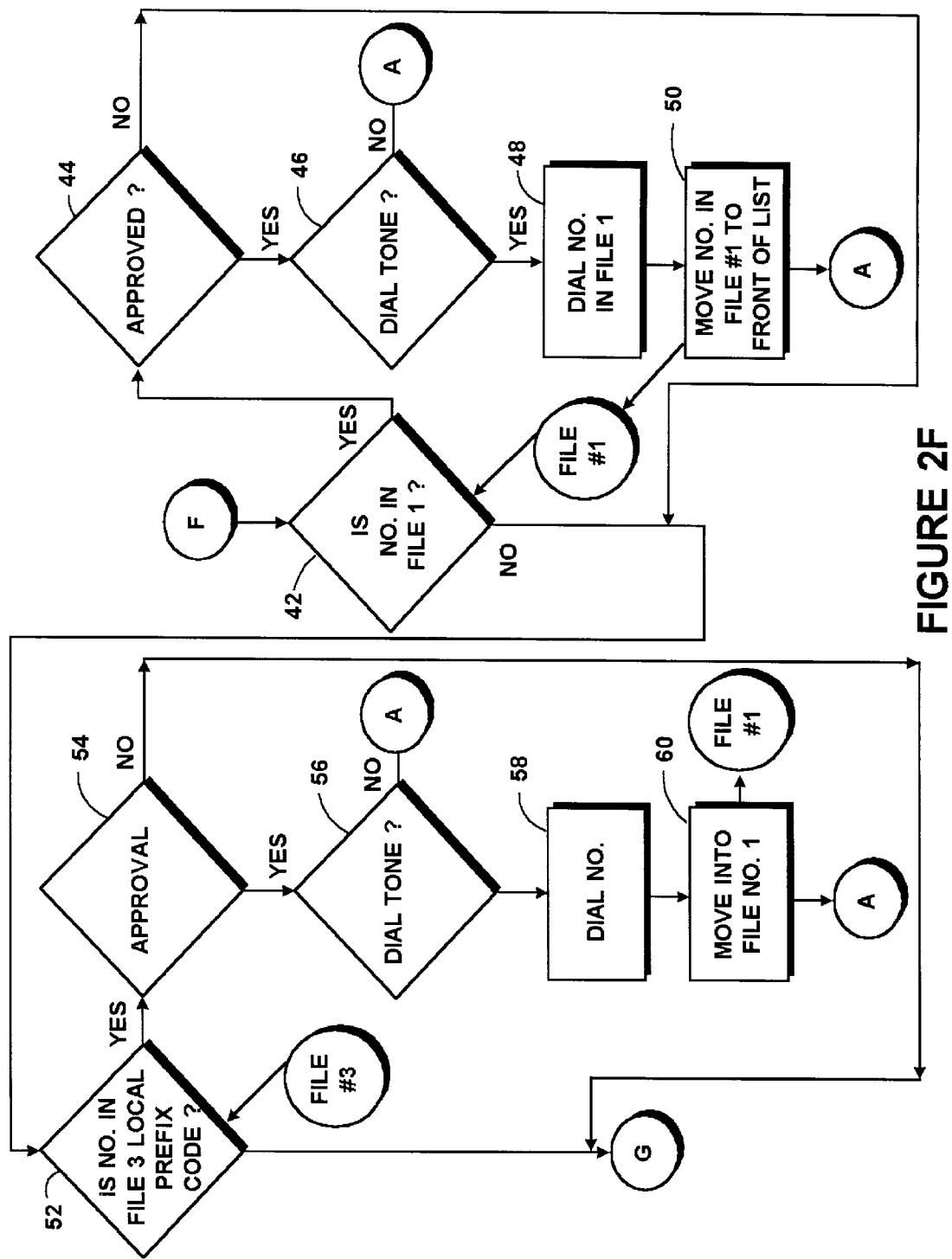

If none of the aborting events has occurred and the system recognizes in step 36 that seven digits have been dialed, the system goes to Point F, shown in FIG. 2F. Referring to FIG. 2F, the system then determines in step 42 whether the digits of the number dialed match the corresponding digits of any number in File 1, ie., the right hand most seven digits of any number in File 1. Those skilled in the art will understand that the part of this system that matches a dialed number to the numbers in File 1 can be based on any predetermined number of digits. Preferably, the number of digits needing to be matched should be a fixed number, a fixed minimum number or a totally variable number.

One skilled in the art will also recognize that the system could be designed so that the caller dials the last four digits of a number, or the last x digits of the number, and the system dials the rest. This type of design would be particularly suitable for a large firm having four digit extensions. A person's extension might be 1111, or his direct dial number might be a 321-1111. The system could be designed so that it would recognize a four digit number, a seven digit number, a 1+ten digit number, or any x digit number.

Referring still to FIG. 2F, if the system determines in step 42 that there is a match, the system in step 44 notifies the caller of the match, which may be accomplished by displaying the corresponding area code of the matched number. The system then determines in step 44 whether the caller has approved the number to be dialed. For example, the caller might depress a key to indicate acceptance. Among the ways the caller may reject the number is by hanging up, at which time the system will abort the call at Point E and the system will return to starting Point A, or the caller may also signal the system to continue its search to File 3 and the remaining files, at which time the system will go to step 52, described below.

If the caller approves the number in step 44, the system then determines in step 46 whether a dial tone exists. If no dial tone is present, the system goes to Point A, at which time the system is ready for the dialing process to start again. Alternatively, the system may momentarily hang up and wait for the dial tone to return and then out-dial, as described below. If the system determines in step 46 that a dial tone exists, the system in step 48 then out-dials the selected number in File 1. The system in step 50 will then delete the out-dialed number from its present position in File 1 and move it to the front of File 1. After the out-dialed number is relocated, the system goes to Point A, at which time the system is ready to receive the next number that the caller dials.

If the system determines in step 42 that the seven digit dialed number does not match the right hand most seven digits of any number in File 1, or if the system determines in step 44 that the caller rejects the number in File 1 but elects to continue searching, the system will determine in step 52 whether the prefix of the seven digit dialed number (also called the NXX or exchange) matches the corresponding digits of any of the numbers in File 3, which holds all the prefixes in the caller's local area code. The prefix generally comprises the first y number of digits in the local number. In the United States, the prefix comprises the first three digits of the local number. If the prefix of the dialed number appears in File 3, i.e., there is a match, the system will advise the caller in step 54 in a manner similar to the one described above. The system then determines in step 54 whether the caller has approved the number to be dialed. As previously described, among the ways the caller may reject the number is by hanging up, at which time the system will abort the call at Point E, or the caller may also signal the system to continue its search to the next highest priority file, at which time the system will go to Point G, described below.

If the caller approves the number in step 54, the system then determines in step 56 whether a dial tone exists. If no dial tone is present, the system goes to Point A, at which time the system is ready for the dialing process to start again. Alternatively, the system may momentarily hang up and wait for the dial tone to return and then out-dial, as described below. If the system determines in step 56 that a dial tone exists, the system in step 58 out-dials the seven digit number. The system in step 60 will then add the out-dialed number to the front of File 1. After the out-dialed number is moved to the front of File 1, the system goes to Point A, at which time the system starts the process anew.

Figure 2G:
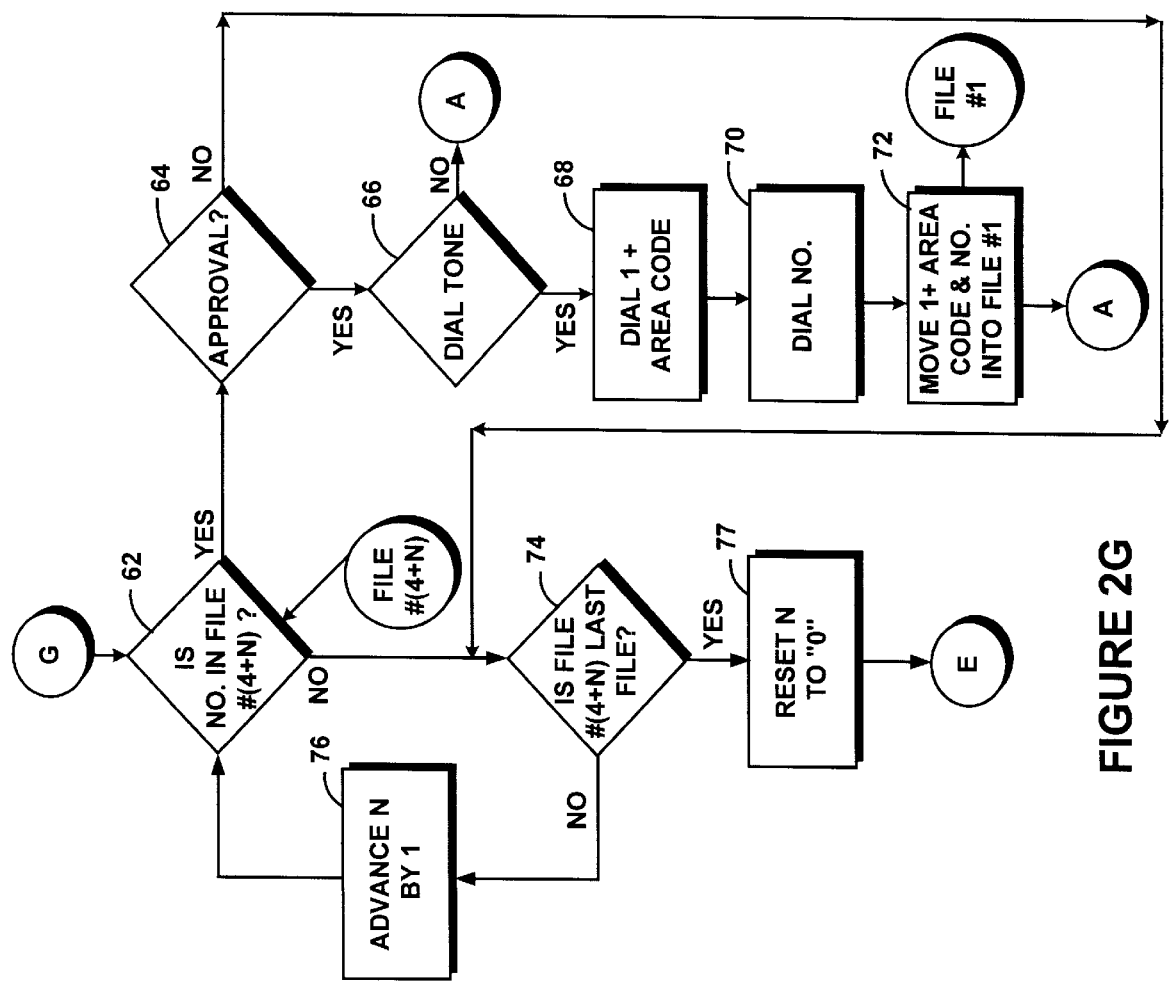

If the system determines in step 52 that the prefix of the seven digit dialed number does not match a number in File 3, or if the system determines in step 54 that the caller rejects the number in File 3 but elects to continue searching, the system will then advance to the highest priority outside area code at Point G, shown in FIG. 2G. Referring to FIG. 2G, the system determines in step 62 whether the prefix of the dialed number matches the corresponding digits of one of the numbers in File 4 (step 77), which contains the respective prefixes of the highest priority outside area code. If the prefix of the seven digit dialed number appears in File 4, i.e., there is a match, the system will advise the caller in step 64 in a manner similar to the one described above. The system then determines in step 64 whether the caller has approved the number to be dialed. As previously described, among the ways the caller may reject the number is by hanging up, at which time the system will abort the call at Point E, or the caller may also signal the system to continue its search to the next highest priority outside area code file, at which time the system will go to step 74, described below.

If the caller approves the number in step 64, the system determines in step 66 whether a dial tone exists. If no dial tone is present, the system proceeds to Point A, at which time the system is ready for the dialing process to start again. Alternatively, the system may momentarily hang up and wait for the dial tone to return and then out-dial, as described below. If the system determines in step 66 that a dial tone exists, the system in step 68 then out-dials 1+ the highest priority area code and then in step 70 out-dials the seven digit number dialed by the caller. In this manner, the complete number, i.e., 1+area code+seven digit dialed number, is out-dialed. The system in step 72 will then add the out-dialed number, including the 1+area code, to the front of File 1. After the out-dialed number is moved to the front of File 1, the system goes to Point A, at which time the system starts the process anew.

If the system determines in step 62 that the prefix of the seven digit dialed number does not match a number in File 4 (step 77), or if the system determines in step 64 that the caller rejects the number in File 4 but elects to continue searching, the system will then advance to the next highest priority outside area code at steps 74, 76. At this point, the system proceeds through each of the N-priority outside area code files, in the same manner described above, until a match is approved, and the matched number including 1+the area code+the seven digit dialed number is out-dialed and stored in File 1, at which time the system will go to Point A, or until the last file has been searched without a match, at which time the system will abort the call at Point E and the system will return to starting point A. The process may be interrupted, of course, if the caller hangs up or the line is no longer available.

Although the preferred system described above is predicated on a data base relating to area codes, one skilled in the art will recognize that other files in a data base may relate to items other than an area code. For example, if a caller needs to dial a 95 and an account code to make a long distance call through his company's PBX system, and then upon receipt of a dial tone the caller must dial a 1, the system could remember this sequence. This type of system would allow the caller to dial only the seven digit local number, or just the last four digits of the phone number, and the system would automatically dial the rest of the number.

Additionally, with cellular phone, the system could have intelligence to recognize the area from which the call originated, and if identical to the area code in the data base, the area code would be omitted even thought it was dialed. One skilled in the art will also recognize that a system similar to the one described above could be used for calls within a company or firm. For example, often a firm will have a four or five digit intercom number. The system could be designed so that after the first call to a party, only the last two digits need be dialed, and the system would supply the rest of the numbers from the data base.

One skilled in the art will also recognize that the invention can be used to operate with international calls. Rather than entering 1+ as is done for a long distance domestic call, the caller enters 011+ to identify an international call. As explained earlier, other files could be added to the data base for international calls. These international files would contain the country codes and exchanges (NXX) for a particular foreign country. Thus, if a caller commonly called the UK, and dialed the local telephone number, the device would select 011, the country code and the area code/city code for the call destination.

Additionally, it should be understood that the intent of keeping numbers in chronological order as explained in pages 7–8 is that the most commonly used numbers become the first choice if there are multiple alternatives. This system allows for the automatic entry of a new similar number that is only used once or one that ultimately becomes a most commonly used number.

There are other logical ways of creating this environment based on criteria other than the most recent call. One such way would be to create a table of all the last numbers dialed, and when there are two or more matches, select based on the number of times each alternative was used in a time period. The selection could also include a table of time lengths for each of the calls, so that the priority selection criteria could be based on the total line usage time, or a mathematical composite of a characteristic of line usage and the number of times called. These are all examples of different alternative priority criteria.

There could be a differentiation between facsimile calls and voice numbers so if someone accidentally dialed a facsimile number that was already in the lookup table, but did so for a voice call, the call either would not go through, or alternatively, it would not be an automatic selection.

Likewise, a facsimile call to a voice number would be aborted. The decision as to whether the call was a facsimile call or a voice call could be based on the characteristics of the signal transmitted after the call was answered, the recognition of a particular signal associated with a fax transmission, or the recognition of a voice, as with a syllabic detector. These methods are well known in the art.

In the foregoing specification, the invention has been described with reference to the presently preferred embodiment thereof. It will, however, be evident that various modifications and changes may be made thereto without departing from the broader spirit and scope of the invention as set forth in the appended claims. The specification and drawings are, therefore, to be regarded in an illustrative rather than a restrictive sense.

What is claimed is:

1. A method of maintaining a database of numbers, each number having a plurality of digits, comprising:

initiating a call by dialing a sequence of digits included in the number to be out-dialed;

before the number is out-dialed, recognizing at least a part of said dialed digits and automatically searching a database that includes at least portions of a plurality of previously out-dialed numbers for said recognized dialed digits;

matching said at least part of said dialed digits to at least a portion of a previously out-dialed number in said database;

causing said identified previously out-dialed number to be out-dialed if there is a match; and if the number to be out-dialed does not match said previously out-dialed number in said database, storing at least a portion of said out-dialed number in said database as a previously out-dialed number only if the call was completed.

2. The method of claim 1 wherein a portion of said out-dialed number is stored in said database as a previously out-dialed number only if the call approximately exceeded an approximate length.

3. The method of claim 1 wherein the determination of whether the call was completed is automatically determined based on call completion information.

4. The method of claim 1 wherein the number out-dialed is not stored in said database as a previously out-dialed number if a caller hangs up before the call is answered.

5. The method of claim 1 wherein the number out-dialed is not stored in said database as a previously out-dialed number if the number out-dialed is not a voice number.

6. The method of claim 1 wherein the number out-dialed is not stored in said database as a previously out-dialed number based on a signal transmitted after a call was answered.

7. A method of maintaining a database of numbers, each number having a plurality of digits, comprising:

initiating a call by dialing a sequence of digits included in the number to be outdialed;

before the number is out-dialed, recognizing at least a part of said dialed digits and automatically searching a database that includes at least portions of a plurality of previously out-dialed numbers available to be out-dialed for said recognized at least one of said dialed digits;

identifying that said number to be out-dialed does not match said previously out-dialed number available to be out-dialed; and preventing said number to be out-dialed from being added to said database as a previously out-dialed number available to be out-dialed if the call was not completed.

8. The method of claim 7 wherein the call is completed only if the call duration approximately exceeded an approximate length.

9. The method of claim 7 wherein the determination of whether the call was completed is based on call completion information.

10. The method of claim 7 wherein the number out-dialed is not stored in said database as a previously out-dialed numbers if a caller hangs up before the call is answered.

11. The method of claim 7 wherein the number out-dialed is not stored in said database as a previously out-dialed number if the number out-dialed is not a voice number.

12. The method of claim 7 wherein the number out-dialed is not stored in said database as a previously out-dialed number based on a signal transmitted after a call was answered.

13. An apparatus for maintaining a database of numbers, each number having a plurality of digits by dialing a sequence of digits included in the number to be out-dialed, comprising:

a device for recognizing at least a part of said dialed digits;

said device automatically searching a database before the number is out-dialed, said database including at least portions of a plurality of previously out-dialed numbers available to be out-dialed, for said recognized dialed digits;

said device causing said identified previously out-dialed number to be out-dialed if there is a match;

said device preventing said number to be out-dialed from being included in said database as a previously out-dialed number if the call was not completed.

14. The apparatus of claim 13 wherein the call is completed only if it approximately exceeded an approximate length.

15. The apparatus of claim 13 wherein the determination of whether the call was completed is based on call completion information.

16. The apparatus of claim 13 wherein the number out-dialed is not stored in said database as a previously out-dialed number if a caller hangs up before the call is answered.

17. The apparatus of claim 13 wherein the number out-dialed is not stored in said database as a previously out-dialed number if the number out-dialed is not a voice number.

18. The apparatus of claim 13 wherein the number out-dialed is not stored in said database as a previously out-dialed number based on a signal transmitted after a call was answered.

19. An apparatus for maintaining a database of numbers, each number having a plurality of digits, comprising:

a device for recognizing at least one of said dialed digits, and for recognizing the sequence and positions of said recognized at least one of said dialed digits within the number to be out-dialed;

said device automatically searching a database before the number is out-dialed, said database including at least portions of a plurality of previously out-dialed numbers, for said recognized at least one of said dialed digits, for the recognized sequence of said recognized at least one of said dialed digits, and for the recognized positions of said recognized at least one of said dialed digits within said at least portions of a plurality of previously out-dialed numbers;

said device automatically matching at least a portion of a previously out-dialed number in said database to said recognized at least one of said dialed digits, and the sequence and positions of said recognized at least one of said dialed digits before the number is out-dialed;

said device automatically identifying said previously out-dialed number containing said matched at least one of said dialed digits and the sequence and positions of said recognized at least one of said dialed digits;

said device causing said identified previously out-dialed number to be out-dialed; and said device preventing said number to be out-dialed from being added to said database as a previously out-dialed number if the call was not completed.

20. The apparatus of claim 19 wherein the call is completed only if it approximately exceeded a predetermined period of time.

21. The apparatus of claim 19 wherein the determination of whether the call was completed is based on call completion information.

22. The apparatus of claim 19 wherein the number out-dialed is not stored in said database as a previously out-dialed number if a caller hangs up before the call is answered.

23. The apparatus of claim 19 wherein the number out-dialed is not stored in said database as a previously out-dialed number if the number out-dialed is not a voice number.

24. The apparatus of claim 19 wherein the number out-dialed is not stored in said database as a previously out-dialed number based on a signal transmitted after a call was answered.

25. The method of claim 1, wherein the number dialed is not out-dialed automatically if it is not stored as a previously out-dialed number.

26. The method of claim 1, wherein the number dialed is not selected automatically if it is not stored as a previously out-dialed number.

27. The method of claim 1, wherein the call is aborted if the number dialed is not stored as a previously out-dialed number.

28. The method of claim 7, wherein the number dialed is not out-dialed automatically if it is not stored as a previously out-dialed number.

29. The method of claim 7, wherein the number dialed is not selected automatically if it is not stored as a previously out-dialed number.

30. The method of claim 7, wherein the call is aborted if the number dialed is not stored as a previously out-dialed number.

31. The apparatus of claim 13, wherein the number dialed is not out-dialed automatically if not stored as a previously out-dialed number.

32. The apparatus of claim 13, wherein the number dialed is not selected automatically if it is not stored as a previously out-dialed number.

33. The apparatus of claim 13, wherein the call is aborted if the number dialed is not stored as a previously out-dialed number.

34. The apparatus of claim 13, wherein the number dialed is not out-dialed automatically if it is not stored as a previously out-dialed number.

35. The apparatus of claim 13, wherein the number dialed is not selected automatically if it is not stored as a previously out-dialed number.

36. The apparatus of claim 13, wherein the call is aborted if the number dialed is not stored as a previously out-dialed number.

\* \* \* \* \*